United States Patent
Yamada et al.

(10) Patent No.: US 8,696,515 B2
(45) Date of Patent: Apr. 15, 2014

(54) COAST STOP VEHICLE AND CONTROL METHOD THEREOF

(75) Inventors: Naohiro Yamada, Atsugi (JP); Keichi Tatewaki, Atsugi (JP); Shinichiro Watanabe, Yokohama (JP); Noritaka Aoyama, Atsugi (JP)

(73) Assignee: JATCO Ltd, Fuji-shi (JP)

( * ) Notice: Subject to any disclaimer, the term of this patent is extended or adjusted under 35 U.S.C. 154(b) by 426 days.

(21) Appl. No.: 13/198,247

(22) Filed: Aug. 4, 2011

(65) Prior Publication Data

US 2012/0053012 A1    Mar. 1, 2012

(30) Foreign Application Priority Data

Sep. 1, 2010 (JP) ................................. 2010-195531

(51) Int. Cl.
*F16H 61/662* (2006.01)

(52) U.S. Cl.
USPC ........................................... 477/47; 477/127

(58) Field of Classification Search
CPC .................. B60W 10/06; B60W 2030/18081; B60W 2030/1809; F16H 61/66272; F16H 2037/028; F16H 37/046; F16H 2061/6608
See application file for complete search history.

(56) References Cited

U.S. PATENT DOCUMENTS

| | | | |
|---|---|---|---|
| 4,730,522 A * | 3/1988 | Morimoto | 477/47 |
| 4,947,953 A * | 8/1990 | Morimoto | 180/179 |
| 5,871,416 A * | 2/1999 | Sawada et al. | 477/47 |
| 6,799,109 B2 | 9/2004 | Nakamori et al. | |
| 7,150,333 B2 * | 12/2006 | Noda et al. | 180/65.26 |
| 2002/0069847 A1 | 6/2002 | Iwano et al. | |
| 2003/0171867 A1 | 9/2003 | Nakamori et al. | |
| 2006/0189436 A1 | 8/2006 | Nakashima et al. | |
| 2010/0167874 A1 | 7/2010 | Shirasaka et al. | |
| 2010/0203989 A1 * | 8/2010 | Shirasaka et al. | 474/28 |

FOREIGN PATENT DOCUMENTS

| | | |
|---|---|---|
| EP | 1 070 868 A2 | 1/2001 |
| JP | 2003-240110 A | 8/2003 |
| JP | 2006-170295 A | 6/2006 |

* cited by examiner

*Primary Examiner* — David D Le
*Assistant Examiner* — Huan Le
(74) *Attorney, Agent, or Firm* — Foley & Lardner LLP (57) ABSTRACT

An oil pump driven by an engine generates a hydraulic pressure supplied to a frictional engagement element. An accumulator provided at an intermediate position of an oil path supplies the hydraulic pressure generated by the oil pump to the frictional engagement element. A controller stops the engine after a hydraulic pressure reducing condition to reduce the hydraulic pressure supplied to the frictional engagement element holds and the hydraulic pressure supplied to the frictional engagement element is reduced.

12 Claims, 5 Drawing Sheets

COAST STOP VEHICLE AND CONTROL METHOD THEREOF

FIELD OF THE INVENTION

The present invention relates to a coast stop technology for automatically stopping an engine during the travel of a vehicle.

BACKGROUND OF THE INVENTION

JP2006-170295A discloses a coast stop technology for automatically stopping an engine during the travel of a vehicle for the purpose of reducing a fuel consumption amount. At a coast stop, fuel supply to the engine is stopped and an automatic transmission is set in a neutral state, thereby completely stopping the rotation of the engine.

The coast stop is also possible in a vehicle including a v-belt continuously variable transmission mechanism (hereinafter, referred to as a "variator") as an automatic transmission. To perform a coast stop, fuel supply to the engine may be stopped and a frictional engagement element (clutch or brake) arranged before or after the variator to switch transmission and non-transmission of power may be released.

SUMMARY OF THE INVENTION

Since an oil pump driven by the engine also stops when the engine stops, a supply pressure to pulleys of the variator, i.e. a belt clamping pressure is also reduced. At this time, if the frictional engagement element is kept engaged with the release thereof delayed, when a torque is input from drive wheels such as due to braking, this torque is transmitted to the variator via the frictional engagement element and slippage occurs between the belt and the pulleys. Thus, the frictional engagement element needs to be released simultaneously with or before the stop of the engine.

However, there are cases where an accumulator for preventing the occurrence of a shock caused by sudden engagement of a clutch such as when an N-D select is being made is provided at an intermediate position of an oil path for supplying a hydraulic pressure to a frictional engagement element. If such an accumulator is provided, the release of the frictional engagement element is delayed until a hydraulic pressure accumulated in the accumulator is drained and the frictional engagement element cannot be released simultaneously with or before the stop of an engine even if an instruction to release the frictional engagement element is given simultaneously with an instruction to stop fuel supply to the engine.

The present invention was developed in view of the above technical problem and aims to suppress belt slippage at the time of performing a coast stop in a vehicle including a belt-type continuously variable transmission mechanism (variator).

According to an aspect of the present invention, a coast stop vehicle which stops an engine during the travel of the vehicle, includes a continuously variable transmission with a variator including a pair of pulleys and a belt mounted between the pulleys and capable of continuously changing a speed ratio and a frictional engagement element which is provided before or after the variator and enables power transmission when being engaged while disabling power transmission when being released, the continuously variable transmission shifting and outputting output rotation of the engine to drive wheels; an oil pump driven by the engine to generate a hydraulic pressure supplied to the frictional engagement element; an accumulator provided at an inter mediate position of an oil path for supplying the hydraulic pressure generated by the oil pump to the frictional engagement element; and a coast stop control unit which stops the engine after a hydraulic pressure reducing condition to reduce the hydraulic pressure supplied to the frictional engagement element holds and the hydraulic pressure supplied to the frictional engagement element is reduced.

According to another aspect of the present invention, a coast stop method for stopping an engine during the travel of a vehicle. An the vehicle includes a continuously variable transmission with a variator including a pair of pulleys and a belt mounted between the pulleys and capable of continuously changing a speed ratio and a frictional engagement element which is provided before or after the variator and enables power transmission when being engaged while disabling power transmission when being released, the continuously variable transmission shifting and outputting output rotation of the engine to drive wheels; an oil pump driven by the engine to generate a hydraulic pressure supplied to the frictional engagement element; and an accumulator provided at an intermediate position of an oil path for supplying the hydraulic pressure generated by the oil pump to the frictional engagement element. The method includes a coast stop control step of stopping the engine after a hydraulic pressure reducing condition to reduce the hydraulic pressure supplied to the frictional engagement element holds and the hydraulic pressure supplied to the frictional engagement element is reduced.

Embodiments and advantages of this invention will be described in detail below with reference to the attached figures.

DESCRIPTION OF THE PREFERRED EMBODIMENTS

Hereinafter, embodiments of the present invention are described with reference to the accompanying drawings. In the following description, a "speed ratio" of a certain transmission is a value obtained by dividing an input rotation speed of this transmission by an output rotation speed thereof. A "lowest speed ratio" means a maximum speed ratio of this transmission and a "highest speed ratio" means a minimum speed ratio thereof.

Figure 1:
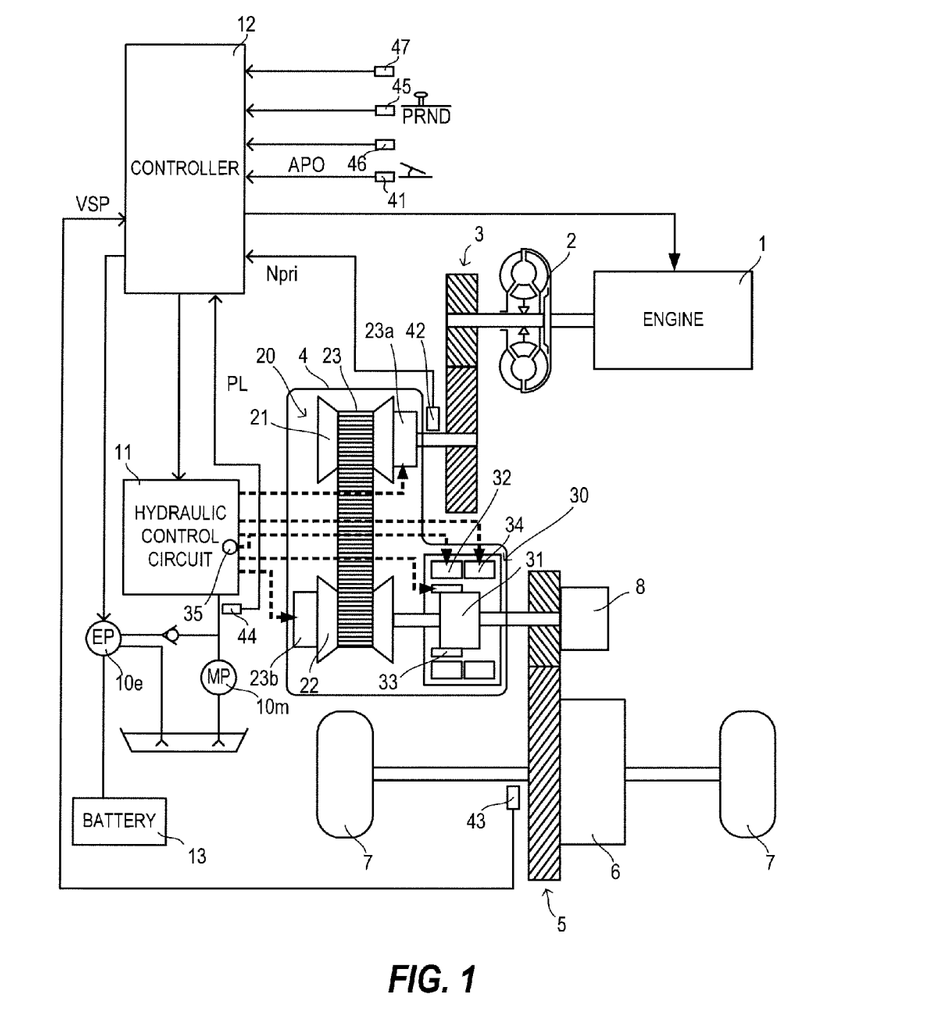
FIG. 1 is a schematic construction diagram of a coast stop vehicle according to a first embodiment of the present invention.

FIG. 1 is a schematic construction diagram of an idle stop vehicle according to a first embodiment of the present invention. This vehicle includes an engine 1 as a driving source, and output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final reduction unit 6. The second gear train 5 includes a parking mechanism 8 for mechanically locking an output shaft of the transmission 4 in a parked state so as not to be able to rotate.

The transmission 4 includes a mechanical oil pump 10m ("MP" in the figure) to which the rotation of the engine 1 is input and which is driven by utilizing a part of power of the engine 1 and an electrical oil pump 10e ("EP" in the figure) which is driven upon receiving the supply of power from a battery 13. The electrical oil pump 10e is composed of an oil pump main body and an electric motor and a motor driver for driving and rotating the oil pump main body, and can control a driving load to an arbitrary load or in multiple stages. The transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to the respective parts of the transmission 4.

The transmission 4 includes a belt-type continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to a stage (input shaft side) before the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and a hydraulic cylinder 23a, 23b provided on the back surface of the movable conical plate for displacing the movable conical plate in an axial direction. When hydraulic pressures supplied to the hydraulic cylinders 23a, 23b are adjusted, the width of the V-groove changes to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If the supply of hydraulic pressures to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The sub transmission mechanism 30 is set to a second gear position with a gear ratio smaller than in the first gear position if the high clutch 33 is engaged and the low brake 32 and the reverse brake 34 are released. The sub-transmission mechanism 30 is set to a reverse gear position if the reverse brake 34 is engaged and the low brake 32 and the high brake 33 are released. In the following description, a case where the sub-transmission mechanism 30 is in the first gear position is expressed by that "the transmission 4 is in a low-speed mode" and a case where the sub-transmission mechanism is in the second gear position is expressed by that "the transmission 4 is in a high-speed mode".

The frictional engagement elements are provided before or after the variator 20 in a power transmission path and any of them enables power transmission of the transmission 4 when being engaged while disabling power transmission of the transmission 4 when being released.

An accumulator 35 is connected at an intermediate position of an oil path for supplying a hydraulic pressure to the low brake 32. The accumulator 35 is for causing the supply and discharge of the hydraulic pressure to and from the low brake 32 to be delayed, and suppresses a sudden increase of the supply hydraulic pressure to the low brake 32 by accumulating the hydraulic pressure when an N-D select is being made, thereby preventing the occurrence of a shock caused by sudden engagement of the low brake 32.

Figure 2:
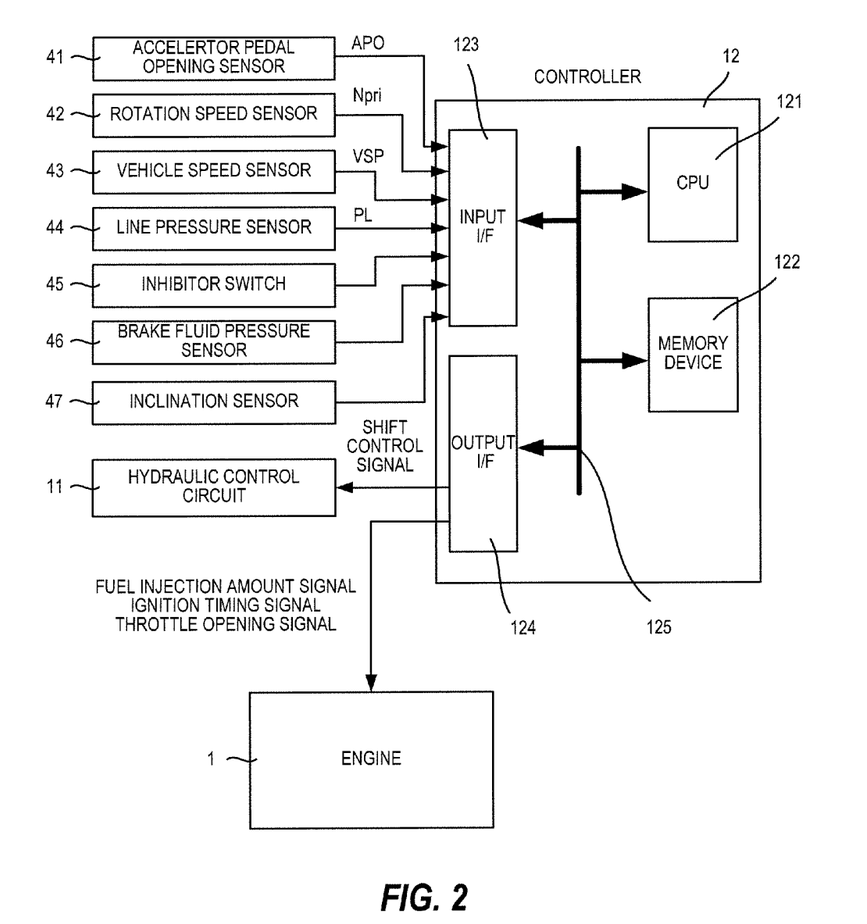
FIG. 2 is a diagram showing the internal construction of a controller.

A controller 12 is the one for controlling the engine 1 and the transmission 4 in a comprehensive manner and includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, output signals of a brake fluid pressure sensor 46 for detecting a brake fluid pressure and an inclination sensor 47 for detecting the inclination of the vehicle road surface gradient) and like output signals.

A control program of the engine 1, a shift control program of the transmission 4, and various maps and tables used in these programs are stored in the memory device 122. The CPU 121 reads a program stored in the memory device 122 and implements it, performs various computations on various signals input via the input interface 123 to generate a fuel injection amount signal, an ignition timing signal, a throttle opening signal, a shift control signal and a drive signal of the electrical oil pump 10e, and outputs the generated signals to the engine 1, the hydraulic control circuit 11 and the motor driver of the electrical oil pump 10e via the output interface 124. Various values used in the computations by the CPU 121 and computation results are stored in the memory device 122.

The hydraulic control circuit 11 includes a plurality of flow passages and a plurality of hydraulic control valves. In accordance with the shift control signal from the controller 12, the hydraulic control circuit 11 controls the plurality of hydraulic control valves to switch supply paths of the hydraulic pressure, prepares a necessary hydraulic pressure from a hydraulic pressure produced in the mechanical oil pump 10m or the electrical oil pump 10e, and supplies this hydraulic pressure to the respective components of the transmission 4. In this way, the speed ratio of the variator 20 and gear position of the sub-transmission mechanism 30 are changed to shift the transmission 4.

Figure 3:
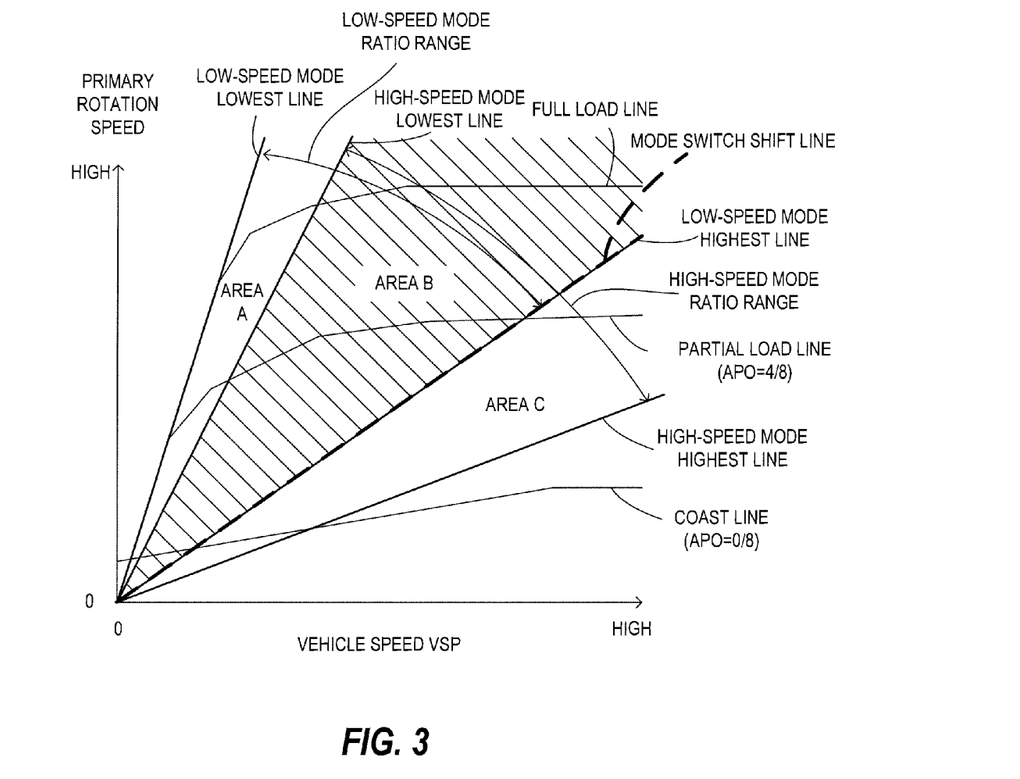
FIG. 3 is a graph showing an example of a shift map.

FIG. 3 shows an example of a shift map stored in the memory device 122. The controller 12 controls the variator 20 and the sub-transmission mechanism 30 according to a driving state of the vehicle (vehicle speed VSP, primary rotation speed Npri, accelerator pedal opening APO) in accordance with this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by that of the sub-transmission mechanism 30, hereinafter, referred to as a "through speed ratio"). In this shift map, a shift line is set for each accelerator pedal opening APO similar to a shift map of a conventional belt-type continuously variable transmission, and the transmission 4 is shifted in accordance with the shift line selected based on the accelerator pedal opening APO. For simplicity, only a full load line (shift line when the accelerator pedal opening APO=8/8), a partial load line (shift line when the accelerator pedal opening APO=4/8) and a coast line (shift line when the accelerator position APO=0/8) are shown in FIG. 3.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio. In this case, the operating point of the transmission 4 moves in areas B and C.

The speed ratio of each gear position of the sub-transmission mechanism 30 is so set that the speed ratio corresponding to the low-speed mode highest line (low-speed mode highest speed ratio) is smaller than the speed ratio corresponding to the high-speed mode lowest line (high-speed mode lowest speed ratio). By this, a range of the through speed ratio of the transmission 4 that can be set in the low-speed mode ("low-speed mode ratio range" in FIG. 3) and that of the through speed ratio of the transmission 4 that can be set in the high-speed mode ("high-speed mode ratio range" in FIG. 3) partly overlap, and the transmission 4 can be selectively set in either one of the low-speed mode or the high-speed mode if the operating point of the transmission 4 is in the area B defined between the high-speed mode lowest line and the low-speed mode highest line.

On this shift map, a mode switch shift line at which the sub-transmission mechanism 30 is shifted is so set as to overlap the low-speed mode highest line. The through speed ratio corresponding to the mode switch shift line (hereinafter, referred to as a "mode switch speed ratio mRatio") is set at a value equal to the low-speed mode highest speed ratio. The mode switch shift line is set in this way because an input torque to the sub-transmission mechanism 30 decreases as the speed ratio of the variator 20 decreases and a shift shock at the time of shifting the sub-transmission mechanism 30 is suppressed.

When the operating point of the transmission 4 crosses the mode switch shift line, i.e. an actual value of the through speed ratio (hereinafter, referred to as an "actual through speed ratio" Ratio) changes over the mode switch speed ratio mRatio, the controller 12 performs a synchronization shift described below to switch between the high-speed mode and the low-speed mode.

In the synchronization shift, the controller 12 shifts the sub-transmission mechanism 30 and changes the speed ratio of the variator 20 in a direction opposite to a direction in which the speed ratio of the sub-transmission mechanism 30 is changed. At this time, an inertia phase in which the speed ratio of the sub-transmission mechanism 30 actually changes and a period during which the speed ratio of the variator 20 changes are synchronized. The speed ratio of the variator 20 is changed in the direction opposite to the direction in which the speed ratio of the sub-transmission mechanism 30 is changed to prevent a change in the input rotation caused by a step in the actual through speed ratio Ratio from giving a sense of incongruity to a driver.

Specifically, when the actual through speed ratio Ratio of the transmission 4 changes from a low side to a high side over the mode switch speed ratio mRatio, the controller 12 changes the gear position of the sub-transmission mechanism 30 from the first gear position to the second gear position (1-2 shift) and changes the speed ratio of the variator 20 to the low side.

Conversely, when the actual through speed ratio Ratio of the transmission 4 changes from the high side to the low side over the mode switch speed ratio mRatio, the controller 12 changes the gear position of the sub-transmission mechanism 30 from the second gear position to the first gear position (2-1 shift) and changes the speed ratio of the variator 20 to the high side.

The controller 12 executes a coast stop control described below to suppress a fuel consumption amount.

The coast stop control is a control for suppressing the fuel consumption amount by automatically stopping the engine 1 during the travel of the vehicle in a low speed range (coast stop). The coast stop control is common to a fuel-cut control executed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch and the low brake 32.

Upon performing the coast stop, the controller 12 first judges conditions (i) to (iv) listed below:
(i) accelerator pedal is not depressed at all (accelerator pedal opening APO=0)
(ii) brake pedal is depressed (brake fluid pressure is equal to or higher than a predetermined value)
(iii) vehicle speed is a predetermined low speed (e.g. 15 km/h) or lower
(iv) lock-up clutch is released.
These conditions are, in other words, conditions to judge whether or not a driver has an intension to stop the vehicle.

The lock-up clutch is released in the case of crossing a lock-up release line (not shown) set on a shift map from a high-speed side or high rotation side to a low speed side or low rotation side. The controller 12 judges that a coast stop condition holds when all of these conditions (i) to (iv) hold.

When the coast stop condition holds, the controller 12 subsequently reduces an instruction hydraulic pressure to the low brake 32 to zero and causes the hydraulic pressure accumulated in the accumulator 35 to be drained. In terms of reducing the supply hydraulic pressure to the low brake 32, the holding of the coast stop condition means the holding of a condition to reduce the supply hydraulic pressure to the low brake 32 (hydraulic pressure reducing condition). After all the hydraulic pressure accumulated in the accumulator 35 is drained, the controller 12 performs the coast stop.

At the coast stop, fuel supply to the engine 1 is stopped to automatically stop the engine 1. When the engine 1 stops, the mechanical pump 10m driven by the power of the engine 1 also stops and a discharge pressure thereof becomes zero, whereby the low brake 32 is completely released. Since all the hydraulic pressure accumulated in the accumulator 35 is drained beforehand as described above, the low brake 32 is released substantially simultaneously with the stop of the engine 1 and the mechanical pump 10m.

When the supply hydraulic pressure from the mechanical oil pump 10m to the hydraulic cylinders 23a, 23b of the pulleys 21, 22 becomes zero and the low brake 32 is released to free the variator 20 in a rotating direction, a speed ratio of the variator 20 is changed toward a lowest speed ratio by return springs arranged in the hydraulic cylinders 23a, 23b.

When the mechanical oil pump 10m stops, the drive of the electrical oil pump 10e is started and a hydraulic pressure generated in the electrical oil pump 10e is supplied to the hydraulic cylinders 23a, 23b to change the speed ratio of the variator 20 to the lowest speed ratio.

The hydraulic pressure supplied to the hydraulic cylinders 23a, 23b is only for clamping the belt 23 by the pulleys 21, 22 and not sufficient to transmit power. However, since the low brake 32 is released and the sub-transmission mechanism 30 is in a neutral state, even if a torque is input from the drive wheels 7 such as due to braking, this torque is not transmitted to the variator 20 via the sub-transmission mechanism 30 and slippage of the belt 23 is prevented.

After the low brake 32 is released, the controller 12 increases the supply hydraulic pressure to the low brake 32 to a hydraulic pressure (hereinafter, referred to as a "zero-point hydraulic pressure") at which a clearance between an input-side element and an output-side element of the low brake 32 is zero and a torque capacity (transmittable torque) of the low brake 32 is zero. This is to quickly increase the torque capacity of the low brake 32 and improve re-acceleration responsiveness at the time of re-acceleration by maintaining the low brake 32 in a state immediately before engagement during the coast stop.

When the engine 1 is restarted, the rotation speed of the engine 1 settles at a steady rotation speed after revving up. The controller 12 maintains the supply hydraulic pressure to the low brake 32 at the zero-point hydraulic pressure until the revving-up of the engine 1 settles so as to prevent transmission of the revved-up rotation to the drive wheels 7 via the low brake 32.

Judgment as to whether or not the above conditions (i) to (iv) hold is continued also during the coast stop. If even one of them no longer holds, the coast stop condition does not hold and the controller 12 resumes fuel supply to the engine 1 to restart the engine 1 and stops the electrical oil pump 10e when the mechanical oil pump 10m comes to generate a sufficient hydraulic pressure.

Figure 4:
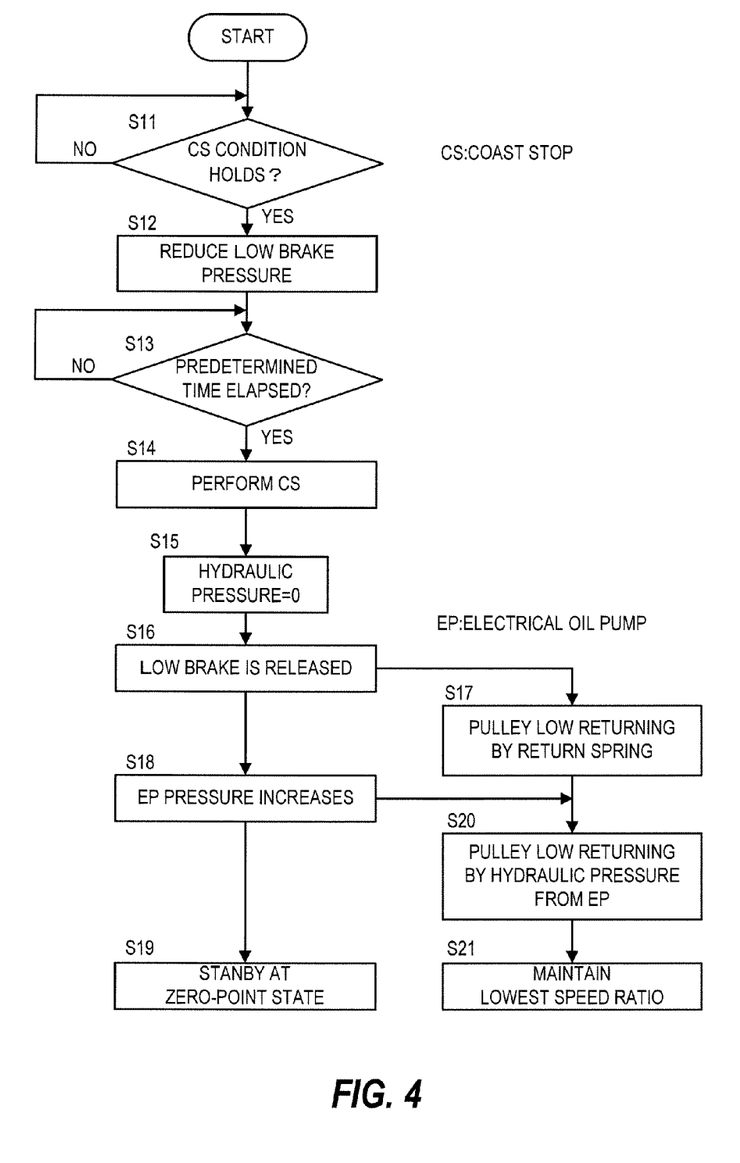
FIG. 4 is a flow chart showing the content of a coast stop control performed by the controller (first embodiment).

FIG. 4 is a flow chart showing the content of the coast stop control executed by the controller 12. The coast stop control is further described with reference to FIG. 4. The contents of the respective steps indicate operations of the variator 20 or the sub-transmission mechanism 30 performed in response to the process of the controller 12 in addition of the content of the process of the controller 12.

In S11, the controller 12 judges whether or not the coast stop condition holds. It is judged that the coast stop condition holds when all of the above conditions (i) to (iv) hold, whereas it is judged that the coast stop condition does not hold when even one of them does not hold. The process proceeds to S12 when it is judged that the coast stop condition holds.

In S12, the controller 12 starts reducing the supply hydraulic pressure to the low brake 32 by reducing the instruction hydraulic pressure to the low brake 32 to zero. By this, the hydraulic pressure accumulated in the accumulator 35 is discharged.

In S13, the controller 12 judges whether or not a predetermined time has elapsed after giving the instruction to reduce the supply hydraulic pressure to the low brake 32 in S12. The predetermined time is a time necessary to drain all the hydraulic pressure accumulated in the accumulator 35. The process proceeds to S14 when it is judged that the predetermined time has elapsed and all the hydraulic pressure accumulated in the accumulator 35 has been drained.

In S14, the coast stop is performed. Specifically, the controller 12 stops fuel supply to the engine 1 to stop the engine 1. Then, the drive of the electrical oil pump 10e is started.

When the engine 1 is stopped, the mechanical oil pump 10m also stops and the discharge pressure thereof becomes zero (S15). Then, the supply hydraulic pressure to the low brake 32 also becomes zero and the low brake 32 is released (S16). Since the hydraulic pressure in the accumulator 35 is drained beforehand, the operations from the stop of fuel supply to the engine 1 in S14 to the release of the low brake 32 in S16 are quickly performed.

When the discharge pressure of the mechanical oil pump 10m becomes zero, the supply hydraulic pressure to the hydraulic cylinders 23a, 23b of the pulleys 21, 22 becomes zero and the low brake 32 is released to free the variator 20 in the rotating direction, the speed ratio of the variator 20 is changed toward the lowest speed ratio by the return springs provided in the hydraulic cylinders 23a, 23b (S17).

When the electrical oil pump 10e starts and a discharge pressure thereof increases (S18), the controller 12 increases the instruction hydraulic pressure to the low brake 32 to the zero-point hydraulic pressure to increase the supply hydraulic pressure to the low brake 32 to the zero-point hydraulic pressure (S19). By this, the low brake 32 is maintained in the state immediately before engagement, thereby eliminating a delay in the engagement of the low brake 32 and realizing good re-acceleration responsiveness when the engine 1 is restarted and re-accelerated.

Then, the controller 12 maintains the supply hydraulic pressure to the low brake 32 at the zero-point hydraulic pressure until the revving-up at the time of restarting the engine 1 settles so as to prevent revved-up rotation at the time of restarting the engine 1 from being transmitted to cause a shock.

On the other hand, the controller 12 also supplies the discharge pressure of the electrical oil pump 10e to the hydraulic cylinders 23a, 23b of the pulleys 21, 22 to change the speed ratio of the variator 20 to the lowest speed ratio (S20). Thereafter, the controller 12 maintains the speed ratio of the variator 20 at the lowest speed ratio (S21) to realize good acceleration responsiveness at the time of re-acceleration, coupled with the above standby state of the low brake 32 at the zero-point hydraulic pressure.

Figure 5:
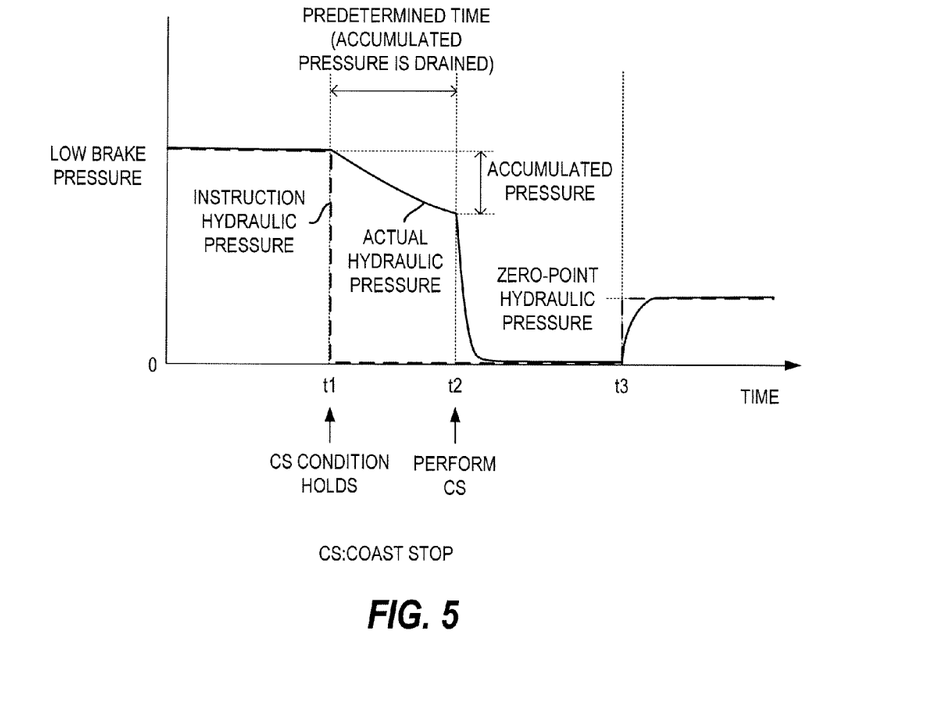
FIG. 5 is a time chart showing a change of a low brake pressure at the time of the coast stop control.

FIG. 5 is a graph showing a change of a low brake pressure when the above coast stop control is executed to perform the coast stop. The operation when the coast stop is performed is further described with reference to FIG. 5.

When the coast stop condition holds at time t1, the instruction hydraulic pressure to the low brake 32 is reduced to zero to reduce the supply hydraulic pressure to the low brake 32.

At time t2 after the elapse of a predetermined time from time t1, all the hydraulic pressure in the accumulator 35 ("accumulated pressure" in FIG. 5) is drained to perform the coast stop. At the coast stop, fuel supply to the engine 1 is stopped to stop the engine 1, the discharge pressure of the mechanical oil pump 10*m* becomes zero and the supply hydraulic pressure to the low brake 32 also becomes zero. Since all the hydraulic pressure in the accumulator 35 is drained beforehand, the stop of the engine 1 and the mechanical oil pump 10*m* and the release of the low brake 32 are substantially simultaneously performed.

Thus, according to the above coast stop control, there is no likelihood that only the supply hydraulic pressure to the hydraulic cylinders 23*a*, 23*b* is reduced too early with the low brake 32 kept engaged. The low brake 32 is substantially simultaneously released when the supply hydraulic pressure to the hydraulic cylinders 23*a*, 23*b* is reduced. In other words, the torque capacity of the variator 20 does not become smaller than that of the low brake 32 during the coast stop.

By this, even if a torque is input from the drive wheels such as due to braking during the coast stop, this torque is not transmitted to the variator 20 via the sub-transmission mechanism 30, wherefore it is possible to prevent a reduction in the durability of the belt 23 caused by slippage between the belt 23 and the pulleys 21, 22. To reduce the supply hydraulic pressure to the low brake 32, it is suitable to zero the instruction hydraulic pressure to the low brake 32 as in this embodiment. Thus, the hydraulic pressure accumulated in the accumulator 35 is drained and the hydraulic pressure of the low brake 32 can be quickly reduced.

At time t3, the instruction hydraulic pressure to the low brake 32 is increased to the zero-point hydraulic pressure to increase the supply hydraulic pressure to the low brake 32 to the zero-point hydraulic pressure. By maintaining the supply hydraulic pressure to the low brake 32 at the zero-point hydraulic pressure, the low brake 32 can be engaged (torque capacity is generated) without delay and good re-acceleration responsiveness can be realized when the engine 1 is restarted to reaccelerate the vehicle in response to a re-acceleration request or intension such as the depression of the accelerator pedal and the release of the brake pedal.

The supply hydraulic pressure to the low brake 32 is maintained at the zero-point hydraulic pressure until the revving-up at the time of restarting the engine 1 settles at a steady rotation, whereby it can be prevented that the revved-up rotation at the time of restarting the engine 1 is transmitted to the drive wheels 7 via the low brake 32 to cause a shock.

Although not shown, the speed ratio of the variator 20 is changed to the lowest speed ratio by the action of the return springs and the supply hydraulic pressure from the electrical oil pump 10*e* during the coast stop. By this, good re-acceleration responsiveness can be realized, coupled with the standby state of the low brake 32 at the zero-point hydraulic pressure.

The embodiment of the present invention has been described above. The above embodiment is merely an illustration of an application example of the present invention and not of the nature to limit the technical scope of the present invention to the specific construction of the above embodiment. Various changes can be made without departing from the gist of the present invention.

For example, in the above embodiment, the reduction of the supply hydraulic pressure to the low brake 32 is started when the coast stop condition holds. However, a condition to reduce the supply hydraulic pressure to the low brake 32 (hydraulic pressure reducing condition) may be judged separately from the coast stop condition and the reduction of the supply hydraulic pressure to the low brake 32 may be started when the hydraulic pressure reducing condition holds.

For example, when it takes time to drain the hydraulic pressure in the accumulator 35, a vehicle speed condition of the hydraulic pressure reducing condition is set to be higher than that of the coast stop condition (e.g. holds at 20 km/h or lower), thereby setting a timing at which the hydraulic pressure reducing condition holds and the reduction of the supply hydraulic pressure to the low brake 32 is started earlier than a timing at which the coast stop condition holds. In FIG. 5, this means the start of the reduction of the supply hydraulic pressure to the low brake 32 before time t1. By this, a time until the accumulated pressure is completely drained and the coast stop is performed after the coast stop condition holds can be shortened.

In terms of simplifying the control, it is preferable to start the reduction of the supply hydraulic pressure to the low brake 32 when the coast stop condition holds as in the above embodiment, i.e. to set hydraulic pressure reducing condition=coast stop condition.

Although the frictional engagement element that is engaged/released at the time of the coast stop is the low brake 32 of the sub-transmission mechanism 30 in the above embodiment, such a frictional engagement element is not limited to the low brake 32 of the sub-transmission mechanism 30.

For example, such a frictional engagement element may be a forward clutch of a forward/reverse switching mechanism in the case of a transmission including the forward/reverse switching mechanism before or after the variator 20. Alternatively, such a frictional engagement element may be a lock-up clutch in the case of a transmission including a torque converter with the lock-up clutch.

Although the variator 20 includes the V-belt 23 as a power transmitting member in the above embodiment, it may include a chain belt instead of the V-belt 23.

This application claims priority based on Japanese Patent Application No. 2010-195531, filed with the Japan Patent Office on Sep. 1, 2010, the entire content of which is incorporated into this specification by reference.

What is claimed is:

1. A coast stop vehicle which stops an engine during travel of the vehicle, comprising:
    a continuously variable transmission with a variator including a pair of pulleys and a belt mounted between the pulleys and capable of continuously changing a speed ratio and a frictional engagement element which is provided before or after the variator and which enables power transmission when being engaged while disabling power transmission when being released, and the continuously variable transmission shifting and outputting output rotation of the engine to drive wheels;
    an oil pump driven by the engine so as to generate a hydraulic pressure supplied to the frictional engagement element;
    an accumulator provided at an inter mediate position of an oil path and configured to supply pressure generated by the oil pump to the frictional engagement element; and
    a coast stop control unit configured to stop the engine after a hydraulic pressure reducing condition to reduce the hydraulic pressure supplied to the frictional engagement element is maintained and the hydraulic pressure supplied to the frictional engagement element is reduced.

2. The coast stop vehicle according to claim 1, further comprising:
    a low returning unit configured to change the speed ratio of the variator toward a maximum speed ratio after the frictional engagement element is released by the coast stop control unit.

3. The coast stop vehicle according to claim 1, wherein:
the coast stop control unit is configured to increase the hydraulic pressure supplied to the frictional engagement element to a zero-point hydraulic pressure at which a clearance between an input-side element and an output-side element of the frictional engagement element is zero and a torque capacity of the frictional engagement element is zero after the frictional engagement element is released.

4. The coast stop vehicle according to claim 3, wherein:
the coast stop control unit is configured to maintain the hydraulic pressure supplied to the frictional engagement element at the zero-point hydraulic pressure until a revving-up of the engine at a time of restarting the engine settles.

5. The coast stop vehicle according to claim 1, further comprising:
a coast stop condition judging unit configured to judge whether or not a coast stop condition to stop the engine during the travel of the vehicle is maintained; a hydraulic pressure reducing condition judging unit configured to judge;
whether or not the hydraulic pressure reducing condition to reduce the hydraulic pressure supplied to the frictional engagement element is maintained; and a hydraulic pressure reducing unit configured to reduce the hydraulic
pressure supplied to the frictional engagement element when the hydraulic pressure reducing condition judging unit judges that the hydraulic pressure reducing condition is maintained, wherein the coast stop control unit is configured to stop the engine after it is judged that the coast stop condition is maintained by the coast stop condition;
judging unit and the hydraulic pressure supplied to the frictional engagement element is reduced by the hydraulic pressure reducing unit.

6. The coast stop vehicle according to claim 5, wherein:
the hydraulic pressure reducing condition judging unit is configured to judge that the hydraulic pressure reducing condition is maintained when the coast stop condition is maintained.

7. The coast stop vehicle according to claim 5, wherein:
the hydraulic pressure reducing unit is configured to reduce the hydraulic pressure supplied to the frictional engagement element until all the hydraulic pressure accumulated in the accumulator is discharged after a reduction of the hydraulic pressure supplied to the frictional engagement element is started.

8. The coast stop vehicle according to claim 5, wherein:
the hydraulic pressure reducing unit is configured to reduce the hydraulic pressure supplied to the frictional engagement element by zeroing an instruction hydraulic pressure to the frictional engagement element.

9. A coast stop method for stopping an engine during travel of a vehicle in the vehicle comprising a continuously variable transmission with a variator including a pair of pulleys and a belt mounted between the pulleys and capable of continuously changing a speed ratio and a frictional engagement element which is provided before or after the variator and which enables power transmission when being engaged while disabling power transmission when being released, and the continuously variable transmission shifting and outputting output rotation of the engine to drive wheels; an oil pump driven by the engine so as to generate a hydraulic pressure supplied to the frictional engagement element; and an accumulator provided at an intermediate position of an oil path and configured to supply the hydraulic pressure generated by the oil pump to the frictional engagement element; the coast stop method comprising: a coast stop control step of stopping the engine after a hydraulic pressure reducing condition to reduce the hydraulic pressure supplied to the frictional engagement element is maintained and the hydraulic pressure supplied to the frictional engagement element is reduced.

10. The coast stop method according to claim 9, further comprising:
a coast stop condition judging step of judging whether or not a coast stop condition to stop the engine during the travel of the vehicle is maintained;
a hydraulic pressure reducing condition judging step of judging whether or not the hydraulic pressure reducing condition to reduce the hydraulic pressure supplied to the frictional engagement element is maintained; and
a hydraulic pressure reducing step of reducing the hydraulic pressure supplied to the frictional engagement element when the hydraulic pressure reducing condition judging step judges that the hydraulic pressure reducing condition is maintained;
wherein the engine is stopped in the coast stop control step after it is judged that the coast stop condition is maintained in the coast stop condition judging step and the hydraulic pressure supplied to the frictional engagement element is reduced in the hydraulic pressure reducing step.

11. A coast stop vehicle which stops an engine during travel of the vehicle, comprising: a continuously variable transmission with a variator including a pair of pulleys and a belt mounted between the pulleys and capable of continuously changing a speed ratio; and a frictional engagement element which is provided before or after the variator and which enables power transmission when being engaged while disabling power transmission when being released, and the continuously variable transmission shifting and outputting output rotation of the engine to drive wheels; an oil pump driven by the engine so as to generate a hydraulic pressure supplied to the frictional engagement element; an accumulator provided at an intermediate position of an oil path and configured to supply the hydraulic pressure generated by the oil pump to the frictional engagement element; and a coast stop control means for stopping the engine after a hydraulic pressure reducing condition to reduce the hydraulic pressure supplied to the frictional engagement element is maintained and the hydraulic pressure supplied to the frictional engagement element is reduced.

12. The coast stop vehicle according to claim 11, further comprising:
a coast stop condition judging means for judging whether or not a coast stop condition to stop the engine during the travel of the vehicle is maintained;
a hydraulic pressure reducing condition judging means for judging whether or not the hydraulic pressure reducing condition to reduce the hydraulic pressure supplied to the frictional engagement element is maintained; and
a hydraulic pressure reducing means for reducing the hydraulic pressure supplied to the frictional engagement element when the hydraulic pressure reducing condition judging means judges that the hydraulic pressure reducing condition is maintained,
wherein the coast stop control means stops the engine after it is judged that the coast stop condition is maintained by the coast stop condition judging means and the hydraulic pressure supplied to the frictional engagement element is reduced by the hydraulic pressure reducing means.

* * * * *